(No Model.)

W. E. CLARKE.
GARMENT SUPPORTER.

No. 347,871. Patented Aug. 24, 1886.

WITNESSES:
Henry J. Stapelton.
Lemuel O. Phillips.

INVENTOR:
William E. Clarke
by Edson Salisbury Jones
Attorney

UNITED STATES PATENT OFFICE.

WILLIAM E. CLARKE, OF PROVIDENCE, RHODE ISLAND.

GARMENT-SUPPORTER.

SPECIFICATION forming part of Letters Patent No. 347,871, dated August 24, 1886.

Application filed February 11, 1886. Serial No. 191,563. (No model.)

*To all whom it may concern:*

Be it known that I, WILLIAM E. CLARKE, a citizen of the United States, residing at Providence, county of Providence, and State of Rhode Island, have invented a new and useful Improvement in Clasps; and I do hereby declare the following specification, taken in connection with the accompanying drawings, forming a part of the same, to be a description thereof.

This invention relates to a clasp which is particularly adapted for use in a garment-supporter, but may be employed for other purposes.

It consists in a clasp having a body portion constructed to be attached to or to receive a band, a spring fastening member attached to said body and adapted to be swung or moved with relation thereto, and a hook on the body portion, which acts in conjunction with said spring fastening member to attach the clasp to the article, as hereinafter described and claimed.

Figure 1:
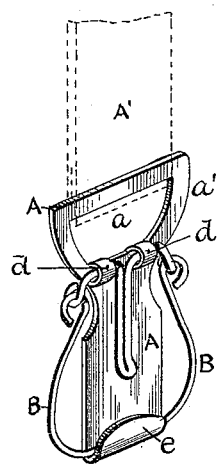
Figure 2:
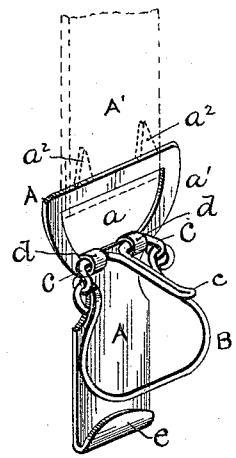
Figure 3:
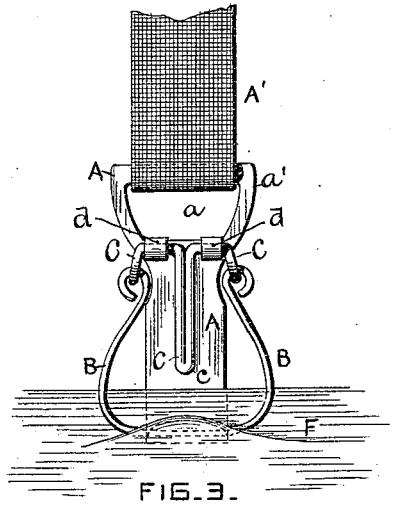
Figure 4:
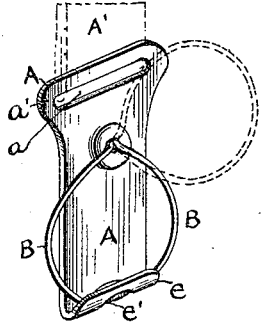

In the accompanying drawings, Figure 1 shows the improved clasp in perspective with the spring fastening member closed. Fig. 2 shows the same with said member opened. Fig. 3 represents the clasp attached to an article. Fig. 4 shows a modification in perspective.

A is the body of the clasp, which is preferably made of sheet metal, and is provided with a hole, $a$, to form an eye, $a'$, on said body for the reception of a band, A', to which the clasp is intended to be secured.

B is the spring fastening member, which is in the form of a wire loop. As shown in Figs. 1, 2, and 3, the free ends of the member B are hinged to a lever, C, having a finger-piece, $c$, and said lever is hinged to the body A in bearings $d$, preferably formed by tangs integral with the body, and bent into tubular form.

At its lower end the body A is bent upwardly to form a hook, $e$, which acts in conjunction with the spring member B to secure the clasp to the article. When the lower portion of the member B is swung toward the body A, and the finger-piece $c$ of the lever C is depressed, the member B will be forced toward the hook $e$, thereby causing it, in conjunction with said hook, to grip any article, F, placed over the hook, as shown in Fig. 3, the lever C locking the member B in a closed position, and the spring function of said member allowing it to accommodate itself to articles of various thicknesses, which will be securely held in the hook by the fastening member.

When the finger-piece $c$ of the lever C is raised, the member B will be lifted from the hook $e$ and swung outward, as shown in Fig. 2, thereby releasing the clasp from the article.

In place of employing the lever C and hinging the fastening member thereto, said lever may be dispensed with and the free ends of the loop B, which forms the fastening member, may be brought together and passed through the body A to hinge the fastening member directly thereto, as shown in Fig. 4, so that the said member can be moved or swung parallel with the body A. In this construction the hook $e$ on the body A is preferably provided with a hole or opening, $e'$, which acts as a lock to the fastening member when the latter is in a closed position.

Instead of furnishing the body A with an opening, $a$, to form an eye, $a'$, for receiving a band, the body may be provided with tangs $a^2$, (shown by dotted lines in Fig. 2,) which can be passed through the band A' and turned down thereon to secure the band to the clasp; or, if desired, the body A may have both the opening $a$ and the tangs $a^2$.

It will be seen that in both the constructions shown in Figs. 1 and 4 the fastening member B is a hinged loop having a spring function, and that it acts in conjunction with the hook $e$ on the body to secure the clasp to an article.

What I claim, and desire to secure by Letters Patent, is—

1. A clasp composed of a body portion formed at one end for direct attachment to a band, and having a hook, $e$, at its opposite end, and a hinged spring fastening member having the form of a loop and adapted to act in conjunction with said hook to secure the clasp to an article, substantially as described.

2. A clasp composed of a body portion formed at one end for direct attachment to a band, and provided with a hook, $e$, at its opposite end, a hinged spring fastening member having the form of a loop, and means for locking said fastening member in a closed position in contact with the hook, substantially as described.

3. The combination of the body A, constructed as described, for attachment to a band, and having a hook, e, a lever, C, hinged to said body, and a spring fastening member, B, in the form of a loop hinged to said lever, and adapted to co-operate with said hook to secure the clasp to an article, substantially as set forth.

WM. E. CLARKE.

Witnesses:
EDSON SALISBURY JONES,
HENRY J. STAPLETON.